No. 887,024. PATENTED MAY 5, 1908.
A. M. ANDERSON & C. QUESNELL.
THRESHING MACHINE.
APPLICATION FILED SEPT. 25, 1906.

Andrew M. Anderson and
Cornelius Quesnell
INVENTORS

WITNESSES:

By C. A. Snow & Co.
ATTORNEYS

UNITED STATES PATENT OFFICE.

ANDREW M. ANDERSON AND CORNELIUS QUESNELL, OF MOSCOW, IDAHO, ASSIGNORS, BY DIRECT AND MESNE ASSIGNMENTS, TO IDAHO NATIONAL HARVESTER COMPANY, LIMITED, OF MOSCOW, IDAHO, A CORPORATION.

THRESHING-MACHINE.

No. 887,024.      Specification of Letters Patent.      Patented May 5, 1908.

Application filed September 25, 1906. Serial No. 336,091.

*To all whom it may concern:*

Be it known that we, ANDREW M. ANDERSON and CORNELIUS QUESNELL, citizens of the United States, residing at Moscow, in the county of Latah and State of Idaho, have invented a new and useful Threshing-Machine, of which the following is a specification.

This invention relates to threshing machines and more particularly to means for pneumatically separating the grain immediately subsequent to the threshing operation.

The object of the invention is to provide novel means for distributing air under pressure over a large area into which the threshed grain is deposited.

Another object is to provide means for holding the straw after the grain has been threshed so that it will not commingle in very great quantities with the grain separated therefrom.

With the above and other objects in view the invention consists of an air distributing pipe disposed adjacent the concave of the threshing machine said pipe being so shaped and located as to discharge a large number of jets of air in various directions so as to produce a considerable area of air in motion and through which the grain is adapted to pass when discharged from the concave.
Means are utilized for collecting and conveying the separated grain to a desired point of delivery and means are also employed for supporting the straw above the collecting and conveying means so as not to interfere with the operation thereof.

The invention also consists of certain other novel features of construction and combinations of parts which will be hereinafter more fully described and pointed out in the claims.
In the accompanying drawings is shown the preferred form of the invention.

Figure 1:
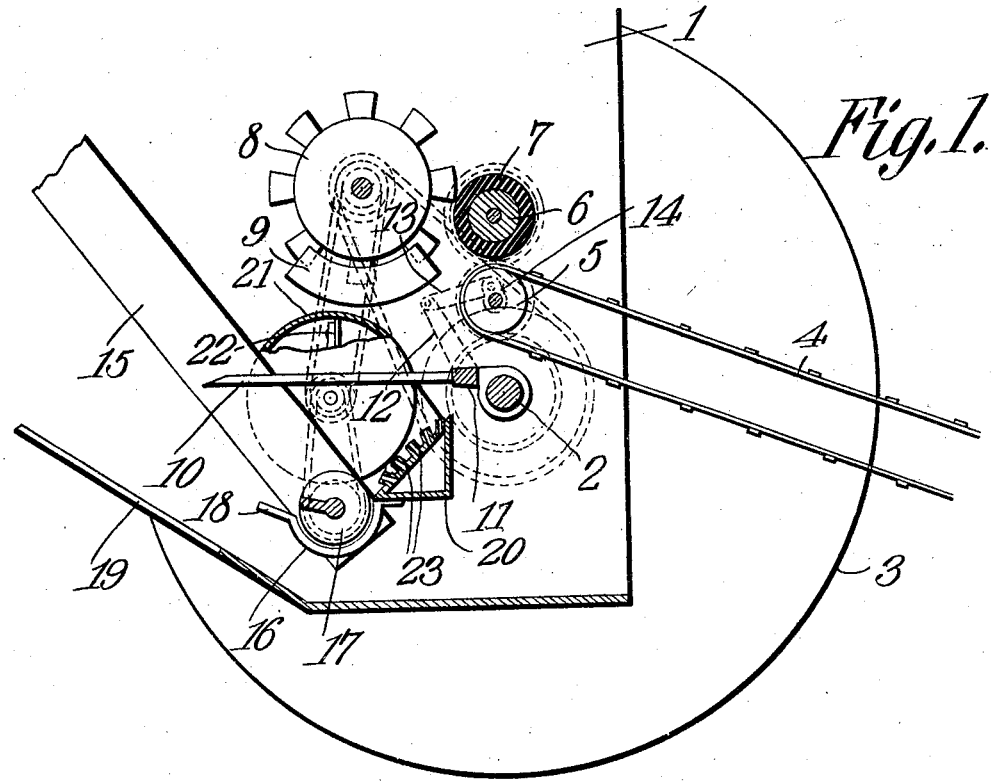
Figure 2:
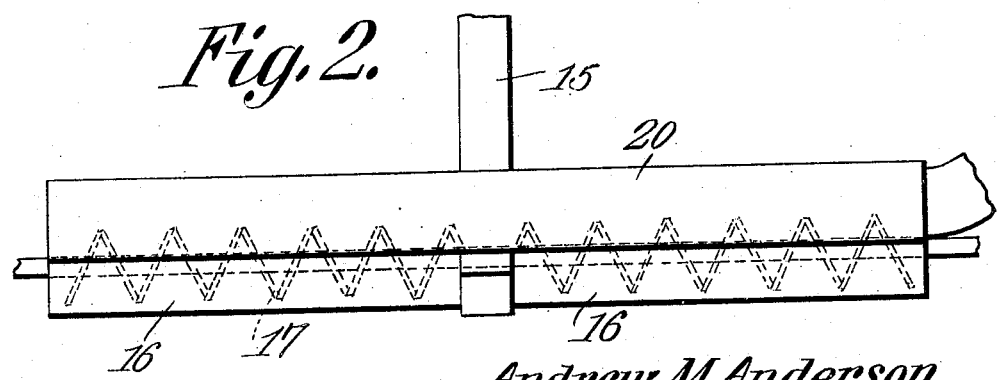

In said drawings: Figure 1 is a vertical section through the separator and showing the threshing and feeding mechanism adjacent thereto; and Fig. 2 is a rear elevation of the trough and air distributing flue.

Referring to the figures by characters of reference, 1 is the body of the threshing machine the same being supported by an axle 2 mounted on suitable traction wheels 3. An endless conveyer 4 extends into the front end of the body and the upper portion thereof is arranged upon a roller 5 adapted to be driven by any suitable mechanism not shown from one of the traction wheels 3. A feed roller 6 is disposed above the roller 5 and is covered with a soft flexible material 7 such as rubber, felt, etc., this roller being adapted to rotate simultaneously and in the opposite direction with the roller 5. A threshing cylinder 8 of any desired construction is disposed within the body above a concave 9 and is adapted to act upon the material fed into the body from between the apron 4 and the roller 6. The mechanism for operating the parts above referred to may be of any desired construction and arrangement.

Extending horizontally beneath the concave and throughout the width of the body 1 is a series of elongated fingers 10 extending from a rock shaft 11 adapted to be operated in any desired manner to vibrate the fingers. This vibration of the fingers is preferably produced by arranging an arm 12 at one end of the shaft and connecting it by means of a pitman 13 with a suitable rotatable element such as a crank 14 although it is to be understood of course that any other desired mechanism may be employed. An elevator 15 extends upward from the central portion of the body and its lower end is adapted to receive grain from the inner or adjoining ends of oppositely extending troughs 16 which are disposed below the fingers 10 and contain rotatable spiral conveyers 17 so disposed as to force the grain longitudinally within the troughs and toward the elevator. A tail board 18 is arranged along one edge of each trough and adjacent the discharge opening 19 within the body of the machine, and extending along the opposite edges of the troughs is an air distributing flue 20 which extends throughout the lengths of the troughs and is connected to the fan casing 21 in which a fan 22 is located. This flue 20 is triangular in cross section and one face thereof is provided with a large number of small nozzles 23 said nozzles being disposed at different angles to the face of the flue and having passages through them. The nozzles are so disposed as to discharge air in various directions into the space between the spiral conveyers 17 and the fingers 10 all of said space being filled with air discharged under pressure from the flue 20.

It is thought that the operation of this separator will be fully understood from the foregoing description. When the grain is fed to the concave it is threshed in the usual manner and the straw conveyed from the machine in any of the usual ways. The grain will fall upon the fingers 10 which, being agitated, will separate it from any large particles or straw which may escape from the concave. The grain falling from the fingers and while in position thereon will be met by the broad blast of air discharged from the flue 20 and this air will drive the chaff over the tail board 18 and through the outlet 19, the straw upon the fingers 10 being also blown outward in the same manner. The grain will drop into the troughs 16 and will be conveyed by the worms 17 toward the elevator 15 which will in turn conduct the grain to a desired point. It is to be understood that any preferred mechanism may be employed for driving the worm and the elevator and for actuating the fan.

While we have shown and described the use of nozzles 23 in connection with distributing pipe 20 it is to be understood that these nozzles are not necessarily employed but instead passages may be formed within the distributing pipe at different angles and will be the full equivalents of the nozzles.

What is claimed is:

1. In a threshing machine the combination with a threshing cylinder and concave, and means for directing material on to the concave; of a trough directly below and disposed to receive material directed by gravity from the concave, a series of vibratory fingers disposed between the trough and concave, means disposed between the trough and fingers for directing jets of air along diverging lines between the trough and concave and past the fingers, and an air forcing device for directing air into said means.

2. In a threshing machine the combination with a concave and a trough; of a fan, and a flue for receiving air under pressure therefrom, said flue having apertures therein extending along diverging lines and disposed to direct jets of air along diverging lines between the concave and the trough.

3. In a threshing machine the combination with a concave and a trough; of a flue interposed between the concave and trough and having a flat inclined face formed with a plurality of openings extending along diverging lines, and means for directing air under pressure into the flue to force it through the openings in jets and along diverging lines.

In testimony that we claim the foregoing as our own, we have hereto affixed our signatures in the presence of two witnesses.

ANDREW M. ANDERSON.
CORNELIUS QUESNELL.

Witnesses as to Anderson:
   S. HUNN ATHET,
   M. J. WARRINER.

Witnesses as to Quesnell:
   C. J. ORLAND,
   S. B. H. MCGOWAN.